(12) United States Patent
Yamagiwa

(10) Patent No.: US 9,335,158 B2
(45) Date of Patent: *May 10, 2016

(54) PROJECTOR AND PROJECTOR SYSTEM

(71) Applicant: Funai Electric Co., Ltd., Daito-shi, Osaka (JP)

(72) Inventor: Daisuke Yamagiwa, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 96 days.

This patent is subject to a terminal disclaimer.

(21) Appl. No.: 14/149,917

(22) Filed: Jan. 8, 2014

(65) Prior Publication Data

US 2014/0211216 A1 Jul. 31, 2014

(30) Foreign Application Priority Data

Jan. 28, 2013 (JP) ................................. 2013-012931

(51) Int. Cl.
*G03B 21/14* (2006.01)
*G01B 11/14* (2006.01)
*G06F 3/042* (2006.01)
*H04N 9/31* (2006.01)

(52) U.S. Cl.
CPC .............. *G01B 11/14* (2013.01); *G06F 3/0421* (2013.01); *H04N 9/3129* (2013.01)

(58) Field of Classification Search
CPC . H04N 9/3129; H04N 9/3155; H04N 9/3194; H04N 9/3197; G03B 21/14
USPC ........................ 353/28, 30, 31, 69, 70, 94, 99; 359/198.1, 201.1, 203.1, 204.1, 223.1, 359/225.1, 291; 348/743–747, 757
See application file for complete search history.

(56) References Cited

U.S. PATENT DOCUMENTS

| | | | |
|---|---|---|---|
| 2006/0170874 A1* | 8/2006 | Yumiki et al. | 353/42 |
| 2009/0141252 A1* | 6/2009 | Kamijima | 353/85 |
| 2012/0008103 A1* | 1/2012 | Lalley | G03B 33/06 353/69 |
| 2012/0127323 A1 | 5/2012 | Kasuya et al. | |

FOREIGN PATENT DOCUMENTS

| | | |
|---|---|---|
| JP | 2011-044978 A | 3/2011 |
| JP | 2011-081775 A | 4/2011 |
| JP | 2012-108233 A | 6/2012 |

* cited by examiner

*Primary Examiner* — Sultan Chowdhury
(74) *Attorney, Agent, or Firm* — Crowell & Moring LLP

(57) ABSTRACT

A projector includes a projection portion including a laser beam generation portion and a scanning portion scanning a laser beam, projecting an image, a light detection sensor provided separately from the projection portion, including a light receiving portion receiving the laser beam reflected by a detection object, and a control portion acquiring the position of the detection object on the image on the basis of a detection result of the laser beam.

20 Claims, 7 Drawing Sheets

FIRST EMBODIMENT

FIG.8  SECOND EMBODIMENT
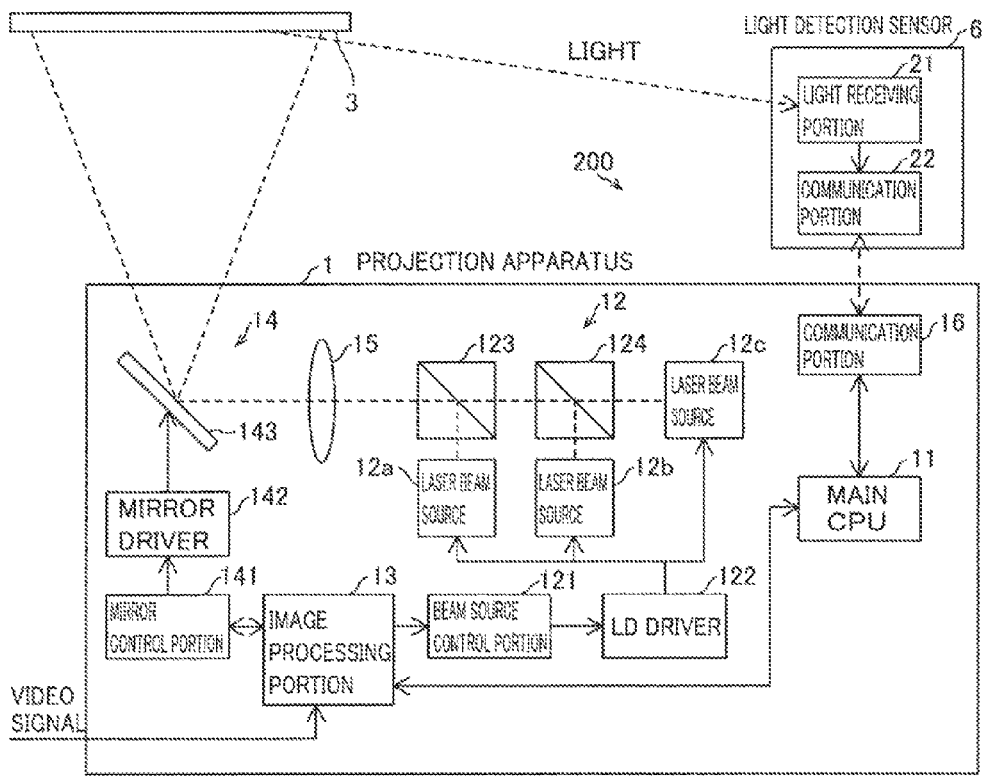
FIG.9
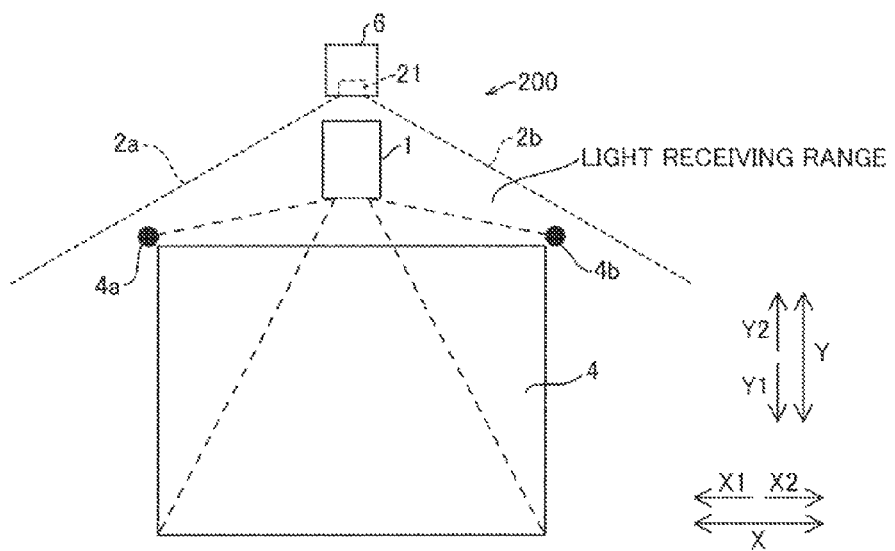

PROJECTOR AND PROJECTOR SYSTEM

BACKGROUND OF THE INVENTION

1. Field of the Invention

The present invention relates to a projector and a projector system.

2. Description of the Background Art

A projector including a projection portion is known in general, as disclosed in Japanese Patent Laying-Open No. 2012-108233, for example.

The aforementioned Japanese Patent Laying-Open No. 2012-108233 discloses a projector including a projection unit (projection portion) projecting an image on a projection surface by a laser beam, a light projecting unit emitting visible light parallel to the projection surface to the vicinity of the projection surface, and a visible camera imaging the light emitted from the light projecting unit and reflected by a user's finger or the like and the projected image. This projector is configured to detect a touch position of the projected image touched by a user on the basis of the reflected light imaged by the visible camera. In this projector, the projection unit, the light projecting unit, and the visible camera are integrally provided.

In the projector described in the aforementioned Japanese Patent Laying-Open No. 2012-108233, however, it is necessary to arrange the projection unit away from the projection surface whereas it is necessary to arrange the light projecting unit in the vicinity of the projection surface, when the user tries to enlarge the image projected on the projection surface. Thus, the projection unit and the light projecting unit are distanced from each other, and hence the projector is disadvantageously increased in size.

SUMMARY OF THE INVENTION

The present invention has been proposed in order to solve the aforementioned problem, and an object of the present invention is to provide a projector and a projector system each kept from being upsized even when a user tries to enlarge an image projected on a projection surface in the projector and the projector system each acquiring the position of a detection object on the image.

A projector according to a first aspect of the present invention includes a projection portion including a laser beam generation portion outputting a laser beam and a scanning portion scanning the laser beam, projecting an image, a light detection sensor provided separately from the projection portion, including a light receiving portion receiving the laser beam reflected by a detection object, and a control portion acquiring the position of the detection object on the image on the basis of a detection result of the laser beam received by the light receiving portion.

In the projector according to the first aspect, as hereinabove described, the projection portion projecting the image and the light detection sensor receiving the laser beam are separately provided, whereby the projection portion can be arranged away from a projection surface independently of the light detection sensor while the light detection sensor can be arranged in the vicinity of the projection surface when a user tries to enlarge the image projected on the projection surface, and hence the projector may not be increased in size in order to distance the projection portion from the projection surface. Thus, an increase in the size of the projector can be suppressed even when the user tries to enlarge the image projected on the projection surface in the projector acquiring the position of the detection object on the image.

In the aforementioned projector according to the first aspect, the control portion is preferably configured to project a detection light beam on the vicinity of the outer periphery of the image that is projected and acquire the light receiving range of the light receiving portion with respect to the image on the basis of a result of the detection light beam received by the light receiving portion. According to this structure, the position and orientation of the light receiving portion can be corrected on the basis of the acquired light receiving range of the light receiving portion with respect to the image even when the projection portion and the light detection sensor receiving the laser beam output from the projection portion and reflected by the detection object are arranged separately from each other, and hence the laser beam reflected by the detection object can be reliably received by the light receiving portion.

In the aforementioned structure of projecting the detection light beam on the vicinity of the outer periphery of the image that is projected, the control portion is preferably configured to project a plurality of detection light beams on the vicinities of the outer periphery of the image that is projected and acquire the light receiving range of the light receiving portion with respect to the image on the basis of a result of the detection light beams received by the light receiving portion. According to this structure, the plurality of detection light beams are detected, whereby the light receiving range of the light receiving portion with respect to the image can be accurately acquired.

In this case, the control portion is preferably configured to determine that the light receiving range of the light receiving portion includes the entirety of the image when the light receiving portion receives all the plurality of detection light beams. According to this structure, the control portion can easily determine whether or not the light receiving range of the light receiving portion includes the entirety of the image by determining whether or not all the plurality of detection light beams have been detected.

In the aforementioned structure of projecting the detection light beam on the vicinity of the outer periphery of the image that is projected, the control portion is preferably configured to project the detection light beam on the outside of the vicinity of the outer periphery of the image that is projected. According to this structure, the light receiving portion detects the detection light beam on the outside of the vicinity of the outer periphery, whereby the entirety of the image that is projected can be included in the light receiving range of the light receiving portion. Furthermore, the detection light beam is projected on the outside of the image that is projected, so that the image that is projected is not missing by the detection light beam, unlike the case where the detection light beam is projected on the inside of the image.

In the aforementioned structure of projecting the plurality of detection light beams on the vicinities of the outer periphery of the image that is projected, the image that is projected preferably has a rectangular shape, and the control portion is preferably configured to project the detection light beams on the vicinities of at least two corners closer to the light detection sensor of the four corners of the image that is projected and has the rectangular shape and acquire the light receiving range of the light receiving portion with respect to the image on the basis of the result of the detection light beams received by the light receiving portion. According to this structure, when the light receiving range of the light receiving portion widens in a sectorial shape, the light receiving portion detects the detection light beams in the vicinity of the two corners closer to the light detection sensor of the four corners of the image that is projected and has the rectangular shape, whereby the control portion can easily determine whether or not the image is included in the light receiving range of the light receiving portion.

In this case, the control portion is preferably configured to project the detection light beams on the vicinities of the four corners of the image that is projected and has the rectangular shape and acquire the light receiving range of the light receiving portion with respect to the image on the basis of the result of the detection light beams received by the light receiving portion. According to this structure, the light receiving portion detects the detection light beams in the vicinity of the four corners of the image that is projected and has the rectangular shape, whereby the light receiving range of the light receiving portion with respect to the image can be more accurately acquired.

In the aforementioned structure of projecting the detection light beam on the vicinity of the outer periphery of the image that is projected, the light detection sensor preferably further includes a drive portion changing the light receiving direction of the light receiving portion, and the control portion is preferably configured to change the light receiving direction of the light receiving portion by the drive portion such that the light receiving range of the light receiving portion includes the entirety of the image on the basis of the result of the detection light beam received by the light receiving portion. According to this structure, the drive portion is driven, whereby the light receiving range of the light receiving portion can easily include the entirety of the image, and hence the operational load on the user can be reduced when the position and orientation of the light receiving portion are corrected.

In the aforementioned structure in which the light detection sensor includes the drive portion, the control portion is preferably configured to rotate the light receiving portion from an orientation of receiving a first detection light beam to an orientation of receiving a second detection light beam by the drive portion and calculate a distance between the light detection sensor and the image employed to detect the first detection light beam and the second detection light beam on the basis of the driving amount of the drive portion rotating the orientation of the light receiving portion when the light receiving portion cannot detect at least one of a plurality of detection light beams. According to this structure, the light detection sensor can be moved such that the light receiving range of the light receiving portion includes the entirety of the image on the basis of the calculated distance.

In this case, the control portion is preferably configured to perform control of notifying a user of the distance between the light detection sensor and the image employed to detect the first detection light beam and the second detection light beam that is calculated. According to this structure, the user can easily move the light detection sensor such that the light receiving range of the light receiving portion includes the entirety of the image on the basis of the notified distance.

In the aforementioned structure of projecting the detection light beam on the vicinity of the outer periphery of the image that is projected, the control portion is preferably configured to perform control of notifying a user of a direction in which the light detection sensor is moved or a position to which the light detection sensor is moved on the basis of the result of the detection light beam received by the light receiving portion. According to this structure, the user can easily correct the position and orientation of the light detection sensor, and hence the light detection sensor can reliably receive the laser beam reflected by the detection object.

In the aforementioned projector according to the first aspect, the control portion is preferably provided in an apparatus provided with the projection portion. According to this structure, the structure of the projector can be simplified as compared with the case where the control portion is provided separately from the projection portion.

In this case, the light detection sensor preferably further includes a communication portion configured to transmit a reception result of the detection light beam to the control portion provided in the apparatus provided with the projection portion. According to this structure, the reception result of the detection light beam can be easily transmitted to the control portion provided in the apparatus provided with the projection portion.

In the aforementioned structure of projecting the detection light beam on the vicinity of the outer periphery of the image that is projected, the laser beam generation portion preferably has a red laser beam generation portion, a green laser beam generation portion, and a blue laser beam generation portion, and the control portion is preferably configured to project the detection light beam by a red laser beam generated from the red laser beam generation portion configured to project the image. According to this structure, the detection light beam is projected by the laser beam from the red laser beam generation portion configured to project the image, and hence no laser beam source configured to project the detection light beam may be provided separately. Furthermore, the red detection light beam has a longer wavelength than a green or blue laser beam, and hence the light receiving portion can reliably detect the detection light beam.

In the aforementioned structure of projecting the detection light beam on the vicinity of the outer periphery of the image that is projected, the control portion is preferably configured to project the detection light beam by an infrared laser beam. According to this structure, the detection light beam is projected by the infrared laser beam that is hardly visually recognized, and hence the detection light beam can be projected on the vicinity of the outer periphery of the image such that the image that is projected is not obstructed.

A projector system according to a second aspect of the present invention includes a projection apparatus including a laser beam generation portion outputting a laser beam and a scanning portion scanning the laser beam, projecting an image, a light detection apparatus provided separately from the projection apparatus, including a light receiving portion receiving the laser beam reflected by a detection object, and a control portion acquiring the position of the detection object on the image on the basis of a detection result of the laser beam received by the light receiving portion of the light detection apparatus.

In the projector system according to the second aspect, as hereinabove described, the projection apparatus projecting the image and the light detection apparatus receiving the laser beam are separately provided, whereby the projection apparatus can be arranged away from a projection surface independently of the light detection apparatus while the light detection apparatus can be arranged in the vicinity of the projection surface when a user tries to enlarge the image projected on the projection surface, and hence a projector may not be increased in size in order to distance the projection apparatus from the projection surface. Thus, an increase in the size of the projector system can be suppressed even when the user tries to enlarge the image projected on the projection surface in the projector system acquiring the position of the detection object on the image.

In the aforementioned projector system according to the second aspect, the control portion is preferably configured to project a detection light beam on the vicinity of the outer periphery of the image that is projected and acquire the light receiving range of the light receiving portion with respect to the image on the basis of a result of the detection light beam received by the light receiving portion. According to this structure, the position and orientation of the light receiving portion can be corrected on the basis of the acquired light receiving range of the light receiving portion with respect to the image even when the projection apparatus and the light detection apparatus receiving the laser beam output from the projection apparatus and reflected by the detection object are arranged separately from each other, and hence the laser beam reflected by the detection object can be reliably received by the light receiving portion.

In the aforementioned projector system configured to project the detection light beam on the vicinity of the outer periphery of the image that is projected, the control portion is preferably configured to project the detection light beam on the outside of the vicinity of the outer periphery of the image that is projected. According to this structure, the light receiving portion detects the detection light beam on the outside of the vicinity of the outer periphery, whereby the entirety of the image that is projected can be included in the light receiving range of the light receiving portion. Furthermore, the detection light beam is projected on the outside of the image that is projected, so that the image that is projected is not missing by the detection light beam, unlike the case where the detection light beam is projected on the inside of the image.

In the aforementioned projector system configured to project a plurality of detection light beams on the vicinities of the outer periphery of the image that is projected, the image that is projected preferably has a rectangular shape, and the control portion is preferably configured to project the detection light beams on the vicinities of at least two corners closer to the light detection apparatus of the four corners of the image that is projected and has the rectangular shape and acquire the light receiving range of the light receiving portion with respect to the image on the basis of a result of the detection light beams received by the light receiving portion. According to this structure, when the light receiving range of the light receiving portion widens in a sectorial shape, the light receiving portion detects the detection light beams in the vicinity of the two corners closer to the light detection apparatus of the four corners of the image that is projected and has the rectangular shape, whereby the control portion can easily determine whether or not the image is included in the light receiving range of the light receiving portion.

In this case, the control portion is preferably configured to project the detection light beams on the vicinities of the four corners of the image that is projected and has the rectangular shape and acquire the light receiving range of the light receiving portion with respect to the image on the basis of the result of the detection light beams received by the light receiving portion. According to this structure, the light receiving portion detects the detection light beams in the vicinity of the four corners of the image that is projected and has the rectangular shape, whereby the light receiving range of the light receiving portion with respect to the image can be more accurately acquired.

According to the present invention, as hereinabove described, the projector can be downsized even when the user tries to enlarge the image projected on the projection surface in the projector acquiring the position of the detection object on the image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a block diagram showing the structure of a projector according to a second embodiment of the present invention;

FIG. 9 is a diagram for illustrating detection light beams of the projector according to the second embodiment of the present invention;

DESCRIPTION OF THE PREFERRED EMBODIMENTS

Embodiments of the present invention are hereinafter described with reference to the drawings.

First Embodiment

The structure of a projector 100 according to a first embodiment of the present invention is now described with reference to FIGS. 1 to 6.

Figure 1:
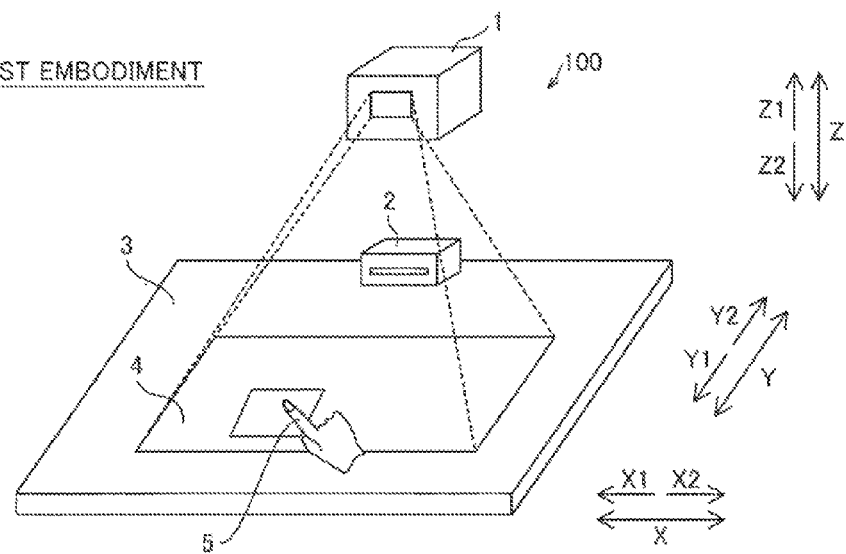
FIG. 1 is a schematic diagram showing the use state of a projector according to a first embodiment of the present invention.

The projector 100 according to the first embodiment of the present invention includes a projection apparatus 1 and a light detection sensor 2, as shown in FIG. 1. The projector 100 is configured to project an image 4 on the upper surface of a projection surface 3. Furthermore, the projector 100 is configured to acquire the position of a detection object 5 such as a user's finger on the image 4. The projection apparatus 1 is an example of the "projection portion" or the "projection apparatus" in the present invention, and the light detection sensor 2 is an example of the "light detection apparatus" or the "light detection sensor" in the present invention. The projector 100 is an example of the "projector system" in the present invention.

Figure 3:
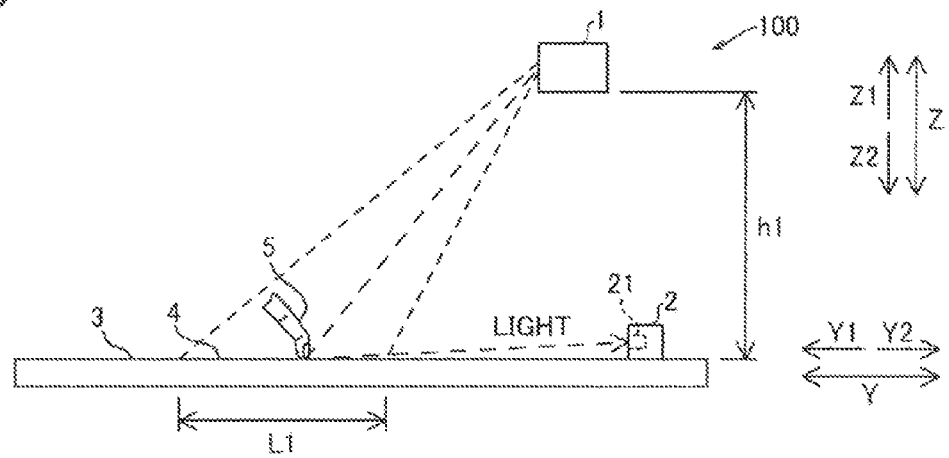
FIG. 3 is a side elevational view showing the use state of the projector according to the first embodiment of the present invention.
Figure 6:
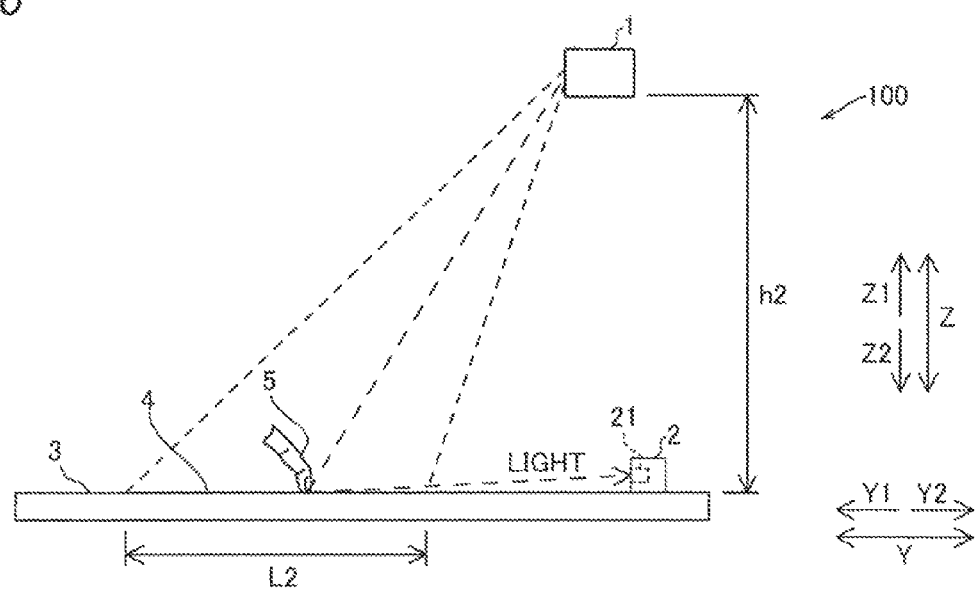
FIG. 6 is a side elevational view showing an example of the case where an image projected by the projector according to the first embodiment of the present invention is enlarged.

The projection apparatus 1 is configured to emit a laser beam to project the image 4 on the projection surface 3. The projection apparatus 1 is arranged above (Z1 side) the projection surface 3, as shown in FIGS. 1 and 3. The projection apparatus 1 is provided separately from the light detection sensor 2. In other words, the distance of the projection apparatus 1 in a direction Z from the projection surface 3 is increased, whereby the size of the image 4 can be enlarged. Specifically, when the projection apparatus 1 is arranged such that the distance thereof in the direction Z from the projection surface 3 is h1, the length of the image 4 in a direction Y is L1, as shown in FIG. 3. When the projection apparatus 1 is arranged such that the distance thereof in the direction Z from the projection surface 3 is h2 that is larger than h1, the length of the image 4 in the direction Y is L2 that is larger than L1, as shown in FIG. 6. The length of the image 4 in a direction X is also increased similarly. Thus, the large image 4 is projected.

Figure 2:
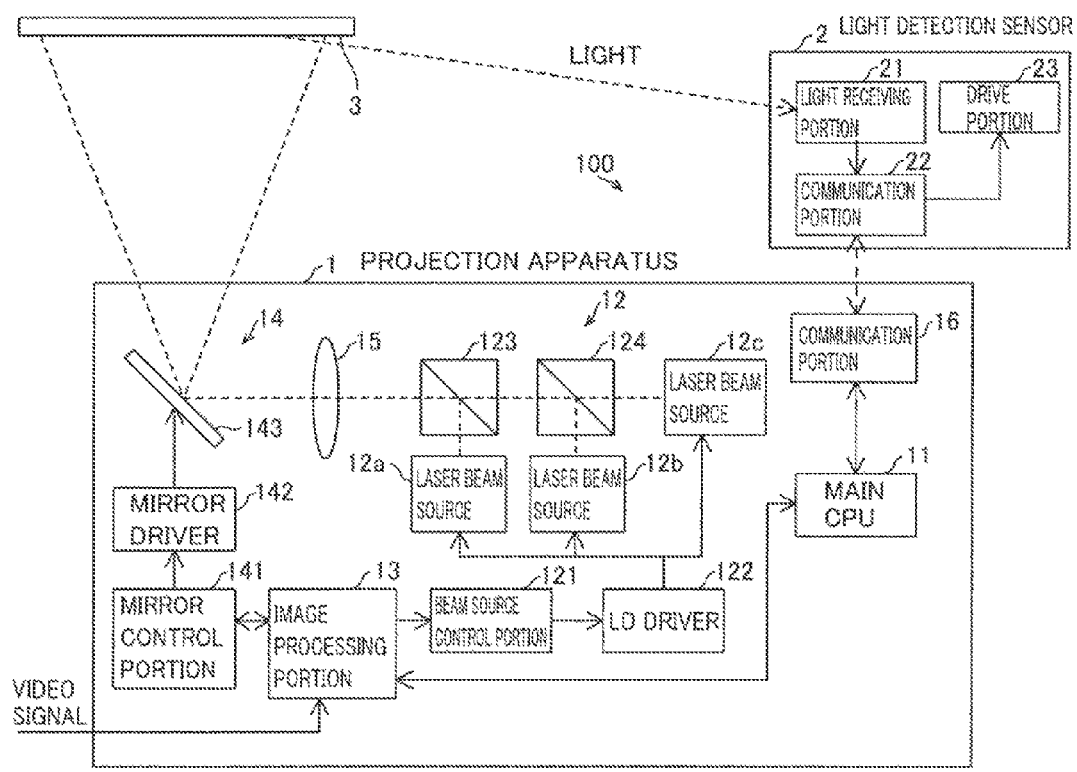
FIG. 2 is a block diagram showing the structure of the projector according to the first embodiment of the present invention.

The projection apparatus 1 includes a main CPU (central processing unit) 11, a laser beam generation portion 12, an image processing portion 13, a scanning portion 14, an optical lens 15, and a communication portion 16, as shown in FIG. 2. The laser beam generation portion 12 includes laser beam sources 12a, 12b, and 12c, a beam source control portion 121, an LD (laser diode) driver 122, and beam splitters 123 and 124. The scanning portion 14 includes a mirror control portion 141, a mirror driver 142, and a MEMS (micro electro mechanical system) mirror 143. The main CPU 11 is an example of the "control portion" in the present invention.

The main CPU 11 is configured to control each part of the projector 100. Specifically, the main CPU 11 is configured to control the image processing portion 13. The main CPU 11 is configured to control a light detection sensor 2 through the communication portion 16. The main CPU 11 is configured to acquire a detection result of a laser beam received by a light receiving portion 21 of the light detection sensor 2 through the communication portion 16. The main CPU 11 is configured to acquire the position of the detection object 5 on the image 4 on the basis of the detection result of the laser beam received by the light receiving portion 21 of the light detection sensor 2. Specifically, the main CPU 11 is configured to specify which position in the image 4 is scanned with the detected laser beam on the basis of the time when the light receiving portion 21 detects the laser beam reflected by the detection object 5 and acquire the position of the detection object 5 corresponding to the image 4.

Figure 4:
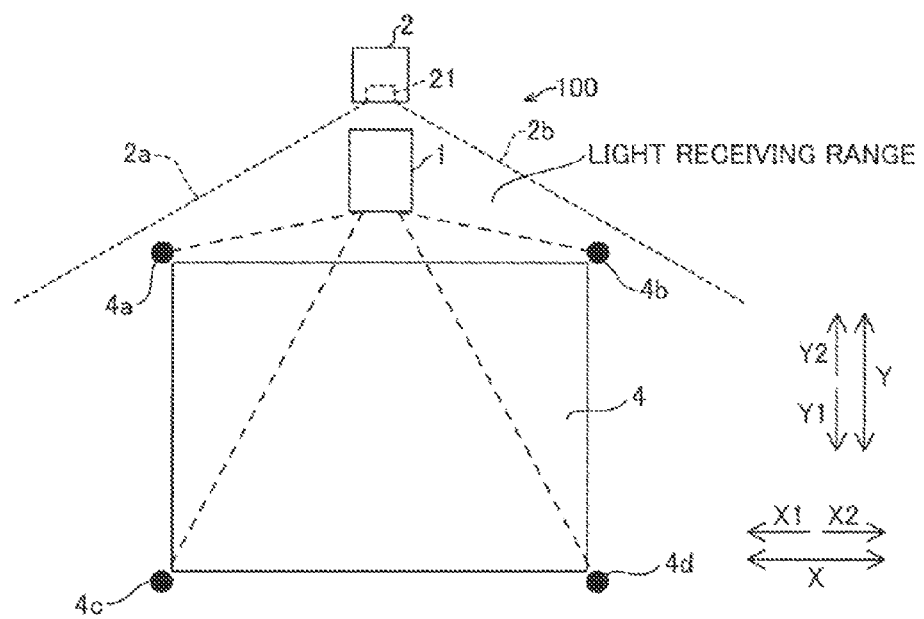
FIG. 4 is a diagram for illustrating detection light beams and the light receiving range of a light receiving portion of the projector according to the first embodiment of the present invention.
Figure 5:
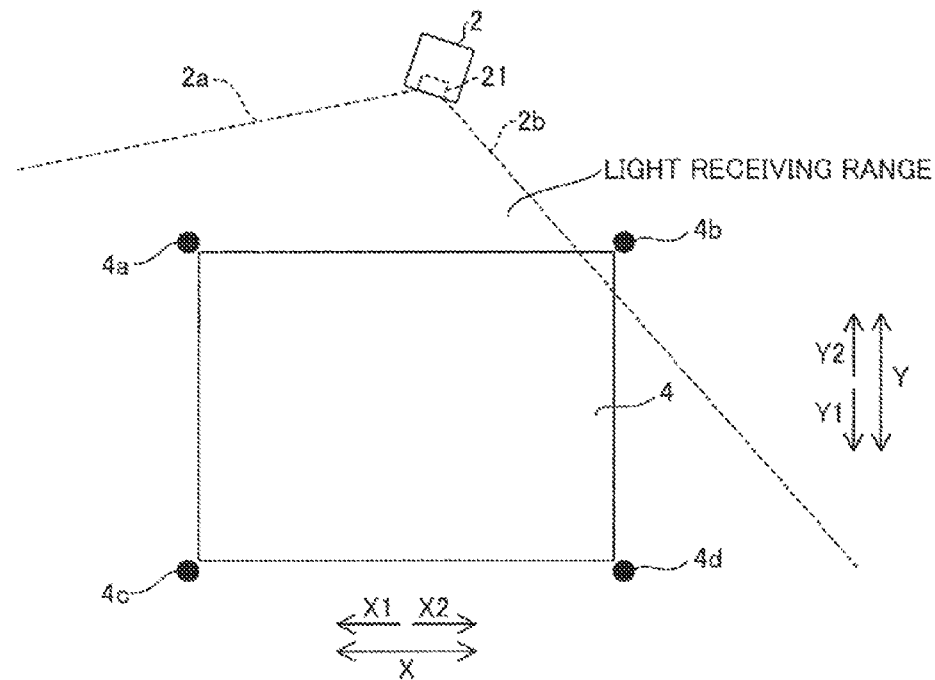
FIG. 5 is a diagram showing the light receiving range of the light receiving portion of the projector according to the first embodiment of the present invention.

According to the first embodiment, the main CPU 11 is configured to project detection light beams 4a, 4b, 4c, and 4d on the outside of the vicinity of the outer periphery of the projected image 4, as shown in FIG. 4. Specifically, the main CPU 11 is configured to project the detection light beams 4a, 4b, 4c, and 4d on the vicinities of the four corners of the projected rectangular image 4. In other words, the main CPU 11 performs control of projecting the detection light beam 4a on the left side (X1 side) closer (Y2 side) to the light detection sensor 2 of the outside of the vicinity of the outer periphery of the projected image 4 and projecting the detection light beam 4b on the right side (X2 side) closer (Y2 side) to the light detection sensor 2 of the outside of the vicinity of the outer periphery of the projected image 4. Furthermore, the main CPU 11 is configured to perform control of projecting the detection light beam 4c on the left side (X1 side) farther (Y1 side) from the light detection sensor 2 of the outside of the vicinity of the outer periphery of the projected image 4 and projecting the detection light beam 4d on the right side (X2 side) farther (Y1 side) from the light detection sensor 2 of the outside of the vicinity of the outer periphery of the projected image 4. The main CPU 11 is configured to project the detection light beams 4a, 4b, 4c, and 4d by red visible laser beams. Thus, the detection light beams 4a to 4d are projected by the red laser beams each having a long wavelength, and hence the light receiving portion 21 can easily receive the detection light beams 4a to 4d.

According to the first embodiment, the main CPU 11 is configured to acquire a result of whether or not the light receiving portion 21 of the light detection sensor 2 has received the detection light beams 4a to 4d. Specifically, the main CPU 11 is configured to acquire the result of whether or not the light receiving portion 21 has received the detection light beams 4a to 4d on the basis of whether or not the light receiving portion 21 received laser beams at the time corresponding to the time when the detection light beams 4a to 4d were projected. Furthermore, the main CPU 11 is configured to acquire the light receiving range of the light receiving portion 21 with respect to the image 4 on the basis of the result of the detection light beams 4a to 4d received by the light receiving portion 21 of the light detection sensor 2.

The light receiving range of the light receiving portion 21 is the range over which the light receiving portion 21 can receive the laser beams and the range in front (Y1 side) of the light receiving portion 21, sandwiched between a left boundary 2a and a right boundary 2b, as shown in FIG. 4. The main CPU 11 determines that the entire image 4 is included in the light receiving range of the light receiving portion 21 when the light receiving portion 21 of the light detection sensor 2 receives all the four detection light beams 4a, 4b, 4c, and 4d, as shown in FIG. 4. The main CPU 11 determines that the entire image 4 is not included in the light receiving range of the light receiving portion 21 when the light receiving portion 21 of the light detection sensor 2 does not receive at least one of the four detection light beams 4a to 4d, as shown in an example of FIG. 5 (in the example of FIG. 5, the detection light beam 4b is not received).

The main CPU 11 is configured to control driving of a drive portion 23 of the light detection sensor 2 through the communication portion 16 and change the orientation of the light receiving portion 21. Specifically, the main CPU 11 is configured to change (rotate) the light receiving direction of the light receiving portion 21 (perform calibration processing described later) by the drive portion 23 of the light detection sensor 2 such that the entire image 4 is included in the light receiving range of the light receiving portion 21 on the basis of the result of the detection light beams received by the light receiving portion 21 of the light detection sensor 2. The main CPU 11 performs control of rotating the light receiving portion 21 from an orientation of receiving one of the detection light beams 4a and 4b to an orientation of receiving the other of the detection light beams 4a and 4b by the drive portion 23 when the light detection sensor 2 is too close to the image 4 to detect both the detection light beams 4a and 4b closer to the light detection sensor 2. Furthermore, the main CPU 11 is configured to calculate a distance between the light detection sensor 2 and the image 4 employed to detect both the detection light beams 4a and 4b closer to the light detection sensor 2 on the basis of the driving amount of the drive portion 23 rotating the orientation of the light receiving portion 21. The detection light beam 4a and the detection light beam 4b are examples of the "first detection light beam" and the "second detection light beam" in the present invention, respectively.

The laser beam generation portion 12 is configured to output a laser beam. Specifically, the laser beam source 12a is configured to allow the beam splitter 123 to reflect a blue laser beam, allow the blue laser beam to pass through the optical lens 15, and apply the blue laser beam to the MEMS mirror 143. The laser beam source 12b is configured to allow the beam splitter 124 to reflect a green laser beam, allow the green laser beam to pass through the beam splitter 123 and the optical lens 15, and apply the green laser beam to the MEMS mirror 143. The laser beam source 12c is configured to allow a red laser beam to pass through the beam splitters 124 and 123 and the optical lens 15 and apply the red laser beam to the MEMS mirror 143. The beam source control portion 121 is configured to control the LD driver 122 on the basis of control performed by the image processing portion 13 and control the laser beam sources 12a to 12c to apply the laser beams. Specifically, the beam source control portion 121 is configured to perform control of applying the laser beam of a color corresponding to each pixel of the image 4 from the laser beam source 12a, 12b, or 12c according to the timing at which the MEMS mirror 143 performs a scan. The laser beam source 12c is configured to apply the red laser beam employed to project the detection light beams 4a to 4d. The laser beam sources 12a, 12b, and 12c are examples of the "blue laser beam generation portion", the "green laser beam generation portion", and the "red laser beam generation portion" in the present invention, respectively.

The image processing portion 13 is configured to control projection of the image on the basis of a video signal input from the outside. Specifically, the image processing portion 13 is configured to control driving of the MEMS mirror 143 through the mirror control portion 141 on the basis of the video signal input from the outside and control the laser beam sources 12a to 12c to apply the laser beams through the beam source control portion 121.

The scanning portion 14 is configured to scan the laser beams to project the image 4 (see FIG. 1) on the projection surface 3. Specifically, the mirror control portion 141 of the scanning portion 14 is configured to control the mirror driver 142 to drive the MEMS mirror 143. The MEMS mirror 143 is configured to scan the laser beams applied from the laser beam sources 12a to 12c to project the image 4 on the projection surface 3. Furthermore, the MEMS mirror 142 is configured to be driven in two axis directions of a horizontal direction and a vertical direction to scan the laser beams.

The communication portion 16 is configured to transmit and receive a signal between the projection apparatus 1 and the light detection sensor 2 through a communication portion 22 of the light detection sensor 2.

The light detection sensor 2 is configured to detect a laser beam. The light detection sensor 2 is arranged on the projection surface 3 separately from the projection apparatus 1, as shown in FIG. 1. The light detection sensor 2 includes the light receiving portion 21, the communication portion 22, and the drive portion 23, as shown in FIG. 2.

The light receiving portion 21 is configured to receive and detect the laser beam. Specifically, the light receiving portion 21 is configured to receive the laser beam reflected by the detection object 5. Furthermore, the light receiving portion 21 is configured to receive and detect the detection light beams 4a to 4d projected on the projection surface 3. The light receiving portion 21 is configured to be capable of receiving light in the light receiving range widening in a sectorial shape in front (Y1 side) of the light receiving portion 21. In addition, the light receiving portion 21 is configured to output a light reception result to the main CPU 11 of the projection apparatus 1 through the communication portion 22.

The communication portion 22 is configured to transmit and receive the signal between the projection apparatus 1 and the light detection sensor 2 through the communication portion 16 of the projection apparatus 1. The drive portion 23 is configured to change the light receiving direction of the light receiving portion 21. Specifically, the drive portion 23 is configured to rotate the light receiving portion 21 in a plane (XY plane) parallel to the projection surface 3.

The calibration processing performed by the main CPU 11 of the projector 100 according to the first embodiment is now described with reference to FIG. 7. This processing is continuously performed when the projector 100 projects the image 4.

Figure 7:
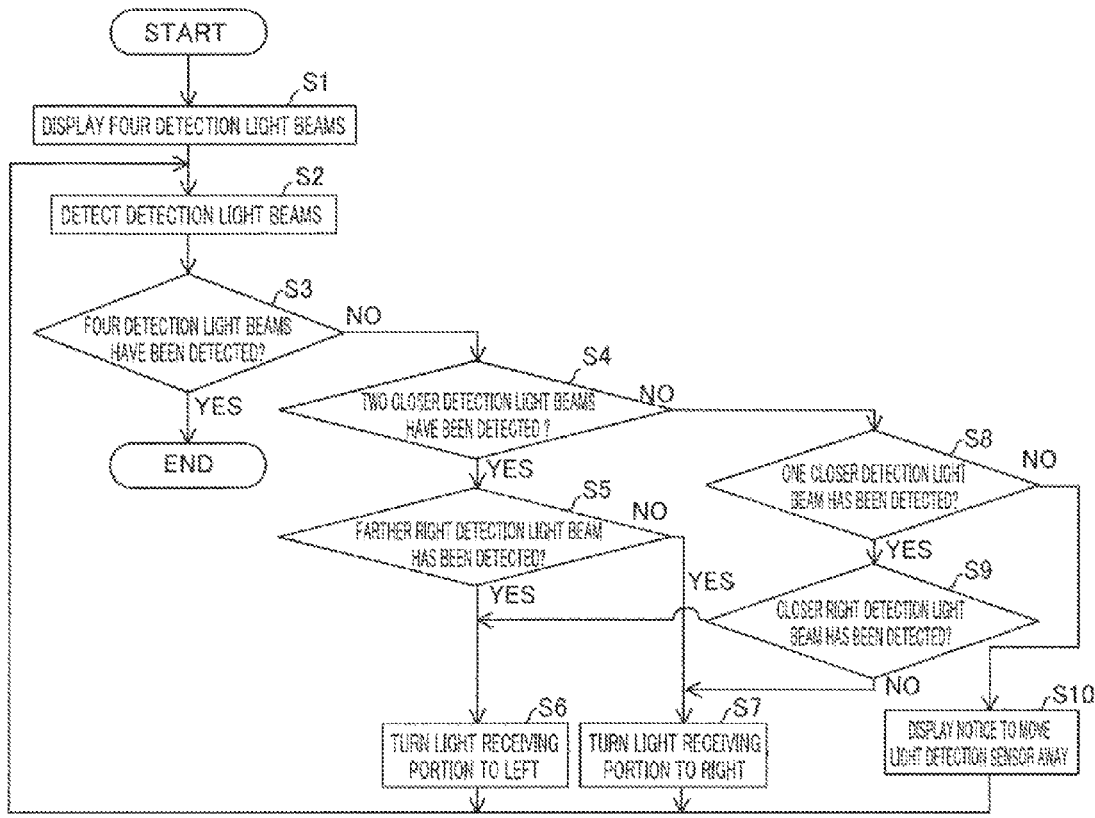
FIG. 7 is a flowchart for illustrating calibration processing performed by a main CPU of the projector according to the first embodiment of the present invention.
Figure 10:
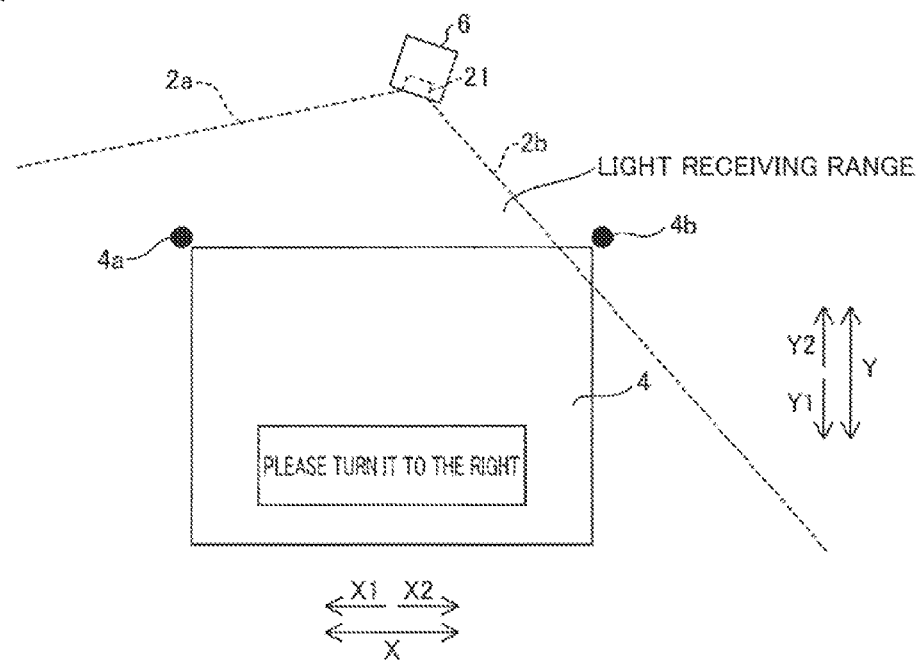
FIG. 10 is a diagram showing a first example of the light receiving range of a light receiving portion of the projector according to the second embodiment of the present invention.
Figure 11:
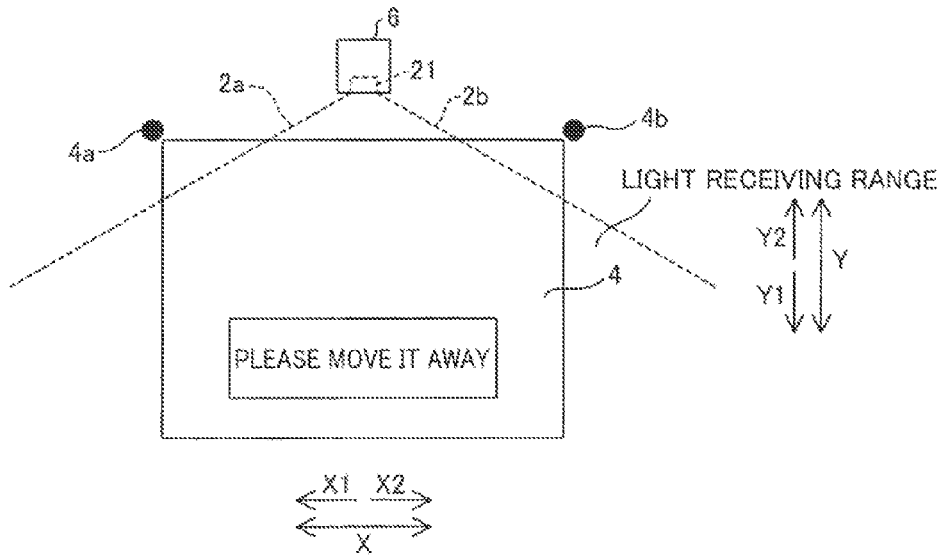
FIG. 11 is a diagram showing a second example of the light receiving range of the light receiving portion of the projector according to the second embodiment of the present invention.

The main CPU 11 performs control of projecting the detection light beams 4a, 4b, 4c, and 4d (see FIG. 4) on the vicinities of the outer periphery of the projected image 4 at a step S1 in FIG. 7. The main CPU 11 is configured to project the detection light beams 4a to 4d for each frame of the image 4. The main CPU 11 detects the detection light beams 4a to 4d at a step S2. Specifically, the main CPU 11 acquires a detection result of the detection light beams 4a to 4d by the light receiving portion 21 of the light detection sensor 2 and detects the detection light beams 4a to 4d.

The main CPU 11 determines whether or not four detection light beams have been detected at a step S3. When determining that the four detection light beams have been detected, the main CPU 11 terminates the calibration processing. When determining that the four detection light beams have not been detected, the main CPU 11 determines whether or not two detection light beams closer to the light detection sensor 2 have been detected at a step S4. Specifically, the main CPU 11 determines whether or not both the detection light beam 4a and the detection light beam 4b (see FIG. 4) have been detected. When determining that both the detection light beam 4a and the detection light beam 4b have been detected, the main CPU 11 advances to a step S5, and when determining that both the detection light beam 4a and the detection light beam 4b have not been detected, the main CPU 11 advances to a step S8.

The main CPU 11 determines whether or not the right detection light beam 4d (see FIG. 4) farther from the light detection sensor 2 has been detected at the step S5. When determining that the detection light beam 4d has been detected, the main CPU 11 advances to a step S6 and controls the drive portion 23 to turn the light receiving portion 21 to the left. In other words, the main CPU 11 turns the light receiving portion 21 to the left in order for the light receiving portion 21 to detect the detection light beam 4c in addition to the detection light beam 4a, the detection light beam 4b, and the detection light beam 4d that are currently detected. Thereafter, the main CPU 11 returns to the step S2. When determining that the detection light beam 4d has not been detected, the main CPU 11 advances to a step S7 and controls the drive portion 23 to turn the light receiving portion 21 to the right. In other words, the main CPU 11 turns the light receiving portion 21 to the right in order for the light receiving portion 21 to detect the detection light beam 4d in addition to the detection light beam 4a and the detection light beam 4b that are currently detected. Thereafter, the main CPU 11 returns to the step S2.

When determining that both the detection light beam 4a and the detection light beam 4b have not been detected at the step S4, the main CPU 11 determines whether or not one detection light beam closer to the light detection sensor 2 has been detected at the step S8. In other words, the main CPU 11 determines whether or not either the detection light beam 4a or the detection light beam 4b has been detected. When determining that either the detection light beam 4a or the detection light beam 4b has been detected, the main CPU 11 advances to a step S9, and when determining that neither the detection light beam 4a nor the detection light beam 4b has been detected, the main CPU 11 advances to a step S10.

The main CPU 11 determines whether or not the right detection light beam 4b closer to the light detection sensor 2 has been detected at the step S9. When determining that the detection light beam 4b has been detected, the main CPU 11 advances to the step S6 and controls the drive portion 23 to turn the light receiving portion 21 to the left. In other words, the main CPU 11 turns the light receiving portion 21 to the left in order for the light receiving portion 21 to detect the detection light beam 4a in addition to the detection light beam 4b that is currently detected. Thereafter, the main CPU 11 returns to the step S2. When determining that the detection light beam 4b has not been detected, the main CPU 11 advances to the step S7 and controls the drive portion 23 to turn the light receiving portion 21 to the right. In other words, the main CPU 11 turns the light receiving portion 21 to the right in order for the light receiving portion 21 to detect the detection light beam 4b in addition to the detection light beam 4a that is currently detected. Thereafter, the main CPU 11 returns to the step S2.

When determining that neither the detection light beam 4a nor the detection light beam 4b has been detected at the step S8, the main CPU 11 performs control of displaying a notice on the image 4 to move the light detection sensor 2 away from the image 4 at the step S10. At this time, the main CPU 11 may display the approximate distance of the light receiving portion 2 away from the image 4 on the image 4. Thereafter, the main CPU 11 returns to the step S2.

According to the first embodiment, as hereinabove described, the projection apparatus 1 projecting the image 4 and the light detection sensor 2 receiving the laser beam are separately provided, whereby the projection apparatus 1 can be arranged away from the projection surface 3 independently of the light detection sensor 2 while the light detection sensor 2 can be arranged in the vicinity of the projection surface 3 when the user tries to enlarge the image 4 projected on the projection surface 3, and hence the projector 100 may not be increased in size in order to distance the projection apparatus 1 from the projection surface 3. Thus, an increase in the size of the projector 100 can be suppressed even when the user tries to enlarge the image 4 projected on the projection surface 3 in the projector 100 acquiring the position of the detection object 5 on the image 4.

According to the first embodiment, as hereinabove described, the main CPU 11 is configured to project the detection light beams 4a to 4d on the vicinities of the outer periphery of the projected image 4 and acquire the light receiving range of the light receiving portion 21 with respect to the image 4 on the basis of the result of the detection light beams 4a to 4d received by the light receiving portion 21. Thus, the position and orientation of the light receiving portion 21 can be corrected on the basis of the acquired light receiving range of the light receiving portion 21 with respect to the image 4 even when the projection apparatus 1 and the light detection sensor 2 receiving the laser beam output from the projection apparatus 1 and reflected by the detection object 5 are arranged separately from each other, and hence the laser beam reflected by the detection object 5 can be reliably received by the light receiving portion 21.

According to the first embodiment, as hereinabove described, the main CPU 11 is configured to project the four detection light beams 4a, 4b, 4c, and 4d on the vicinities of the outer periphery of the projected image 4 and acquire the light receiving range of the light receiving portion 21 with respect to the image 4 on the basis of the result of the detection light beams 4a to 4d received by the light receiving portion 21. Thus, the four detection light beams 4a to 4d are detected, whereby the light receiving range of the light receiving portion 21 with respect to the image 4 can be accurately acquired.

According to the first embodiment, as hereinabove described, the main CPU 11 is configured to determine that the light receiving range of the light receiving portion 21 includes the entire image 4 when the light receiving portion 21 receives all the plurality of detection light beams 4a to 4d. Thus, the main CPU 11 can easily determine whether or not the light receiving range of the light receiving portion 21 includes the entire image 4 by determining whether or not all the plurality of detection light beams 4a to 4d have been detected.

According to the first embodiment, as hereinabove described, the main CPU 11 is configured to project the detection light beams 4a to 4d on the outside of the vicinity of the outer periphery of the projected image 4. Thus, the light receiving portion 21 detects the detection light beams 4a to 4d on the outside of the vicinity of the outer periphery, whereby the projected entire image 4 can be included in the light receiving range of the light receiving portion 21. Furthermore, the detection light beams 4a to 4d are projected on the outside of the projected image 4, so that the projected image 4 is not missing by the detection light beams 4a to 4d, unlike the case where the detection light beams are projected on the inside of the image 4.

According to the first embodiment, as hereinabove described, the main CPU 11 is configured to project the detection light beams 4a to 4d on the vicinities of the four corners of the projected rectangular image 4 and acquire the light receiving range of the light receiving portion 21 with respect to the image 4 on the basis of the result of the detection light beams 4a to 4d received by the light receiving portion 21. Thus, the light receiving portion 21 detects the detection light beams 4a to 4d in the vicinity of the four corners of the projected rectangular image 4, whereby the light receiving range of the light receiving portion 21 with respect to the image 4 can be more accurately acquired.

According to the first embodiment, as hereinabove described, the main CPU 11 is configured to change the light receiving direction of the light receiving portion 21 by the drive portion 23 such that the light receiving range of the light receiving portion 21 includes the entire image 4 on the basis of the result of the detection light beams 4a to 4d received by the light receiving portion 21. Thus, the drive portion 23 is driven, whereby the light receiving range of the light receiving portion 21 can easily include the entire image 4, and hence the operational load on the user can be reduced when the position and orientation of the light receiving portion 21 are corrected.

According to the first embodiment, as hereinabove described, the main CPU 11 is configured to rotate the light receiving portion 21 from the orientation of receiving the detection light beam 4a (4b) to the orientation of receiving the detection light beam 4b (4a) by the drive portion 23 and calculate the distance between the light detection sensor 2 and the image 4 employed to detect the detection light beams 4a and 4b on the basis of the driving amount of the drive portion 23 rotating the orientation of the light receiving portion 21 when the light receiving portion 21 cannot detect at least one of the plurality of detection light beams 4a to 4d. Thus, the light detection sensor 2 can be moved such that the light receiving range of the light receiving portion 21 includes the entire image 4 on the basis of the calculated distance.

According to the first embodiment, as hereinabove described, the main CPU 11 is configured to perform control of notifying the user of the calculated distance between the light detection sensor 2 and the image 4 employed to detect the detection light beams 4a and 4b. Thus, the user can easily move the light detection sensor 2 such that the light receiving range of the light receiving portion 21 includes the entire image 4 on the basis of the notified distance.

According to the first embodiment, as hereinabove described, the main CPU 11 is configured to perform control of notifying the user of a position to which the light detection sensor 2 is moved on the basis of the result of the detection light beams 4a to 4d received by the light receiving portion 21. Thus, the user can easily correct the position of the light detection sensor 2, and hence the light detection sensor 2 can reliably receive the laser beam reflected by the detection object 5.

According to the first embodiment, as hereinabove described, the main CPU 11 is provided in the projection apparatus 1. Thus, the structure of the projector 100 can be simplified as compared with the case where the main CPU 11 is provided separately from the projection apparatus 1.

According to the first embodiment, as hereinabove described, the light detection sensor 2 includes the communication portion 22 configured to transmit the reception result of the detection light beams to the main CPU 11 provided in the projection apparatus 1. Thus, the reception result of the detection light beams can be easily transmitted to the main CPU 11 provided in the projection apparatus 1.

According to the first embodiment, as hereinabove described, the main CPU 11 is configured to project the detection light beams 4a to 4d by the red laser beam generated from the laser beam source 12c configured to project the image 4. Thus, the detection light beams 4a to 4d are projected by the laser beam from the laser beam source 12c configured to project the image 4, and hence no laser beam source configured to project the detection light beams 4a to 4d may be provided separately. Furthermore, the red detection light beams 4a to 4d each have a longer wavelength than the green or blue laser beam, and hence the light receiving portion 21 can reliably detect the detection light beams 4a to 4d.

Second Embodiment

A second embodiment is now described with reference to FIGS. 8 to 12. In this second embodiment, two detection light beams are provided on the outside of the vicinity of the outer periphery of an image, unlike the first embodiment in which the four detection light beams are projected on the outside of the vicinity of the outer periphery of the image.

A projector 200 according to the second embodiment of the present invention includes a projection apparatus 1 and a light detection sensor 6, as shown in FIG. 8.

According to the second embodiment, a main CPU 11 is configured to project two detection light beams 4a and 4b on the outside of the vicinity of the outer periphery of a projected image 4, as shown in FIG. 9. Specifically, the main CPU 11 performs control of projecting the detection light beam 4a on the left side (X1 side) closer (Y2 side) to the light detection sensor 6 of the outside of the vicinity of the outer periphery of the projected image 4 and projecting the detection light beam 4b on the right side (X2 side) closer (Y2 side) to the light detection sensor 6 of the outside of the vicinity of the outer periphery of the projected image 4.

According to the second embodiment, the main CPU 11 is configured to perform control of notifying a user of a direction in which the light detection sensor 6 is moved or a position to which the light detection sensor 6 is moved on the basis of a result of the detection light beams 4a and 4b received by a light receiving portion 21. In an example shown in FIG. 10, for example, the main CPU 11 is configured to notify the user to turn the light detection sensor 6 to the right when determining that the light receiving portion 21 turns to the left (X1 side) on the basis of the result of the detection light beams received by the light receiving portion 21. Specifically, the main CPU 11 is configured to project a message "please turn it to the right" on the image 4. In an example shown in FIG. 11, for example, the main CPU 11 is configured notify the user to move the light detection sensor 6 away from the image 4 when determining that the light receiving portion 21 is too close to the image 4 on the basis of the result of the detection light beams received by the light receiving portion 21. Specifically, the main CPU 11 is configured to project a message "please move it away" on the image 4.

The light detection sensor 6 is configured to detect a laser beam. The light detection sensor 6 is arranged on a projection surface 3 separately from the projection apparatus 1. The light detection sensor 6 includes the light receiving portion 21 and a communication portion 22, as shown in FIG. 8. In other words, the light detection sensor 6 has no drive portion, unlike in the first embodiment. Thus, the light detection sensor 6 has no drive portion, so that the light detection sensor 6 can be further downsized.

Calibration processing performed by the main CPU 11 of the projector 200 according to the second embodiment is now described with reference to FIG. 12. This processing is continuously performed when the projector 200 projects the image 4.

Figure 12:
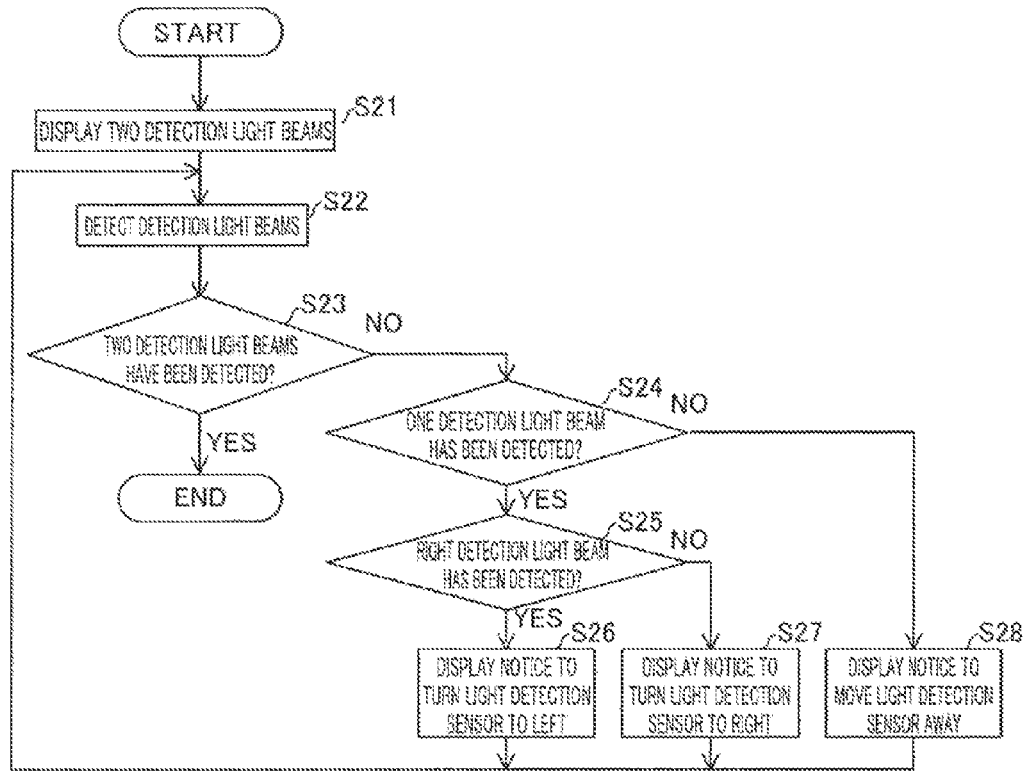
FIG. 12 is a flowchart for illustrating calibration processing performed by a main CPU of the projector according to the second embodiment of the present invention.

At a step S21 in FIG. 12, the main CPU 11 displays two detection light beams. Specifically, the main CPU 11 performs control of projecting the detection light beams 4a and 4b (see FIG. 9) on the vicinities of the outer periphery of the projected image 4. The main CPU 11 detects the detection light beams 4a and 4b at a step S22. Specifically, the main CPU 11 acquires a detection result of the detection light beams 4a and 4b by the light receiving portion 21 of the light detection sensor 6 and detects the detection light beams 4a and 4b.

The main CPU 11 determines whether or not the two detection light beams have been detected at a step S23. When determining that the two detection light beams have been detected, the main CPU 11 terminates the calibration processing. When determining that the two detection light beams have not been detected, the main CPU 11 determines whether or not one detection light beam has been detected at a step S24. Specifically, the main CPU 11 determines whether or not either the detection light beam 4a or 4b has been detected. When determining that either the detection light beam 4a or 4b has been detected, the main CPU 11 advances to a step S25, and when determining that neither the detection light beam 4a nor 4b has been detected, the main CPU 11 advances to a step S28.

The main CPU 11 determines whether or not the right detection light beam 4b has been detected at the step S25. When determining that the detection light beam 4b has been detected, the main CPU 11 advances to a step S26 and performs control of displaying a notice on the image 4 to turn the light detection sensor 6 to the left. In other words, the main CPU 11 notifies the user to turn the light detection sensor 6 (light receiving portion 21) to the left in order for the light detection sensor 6 to detect the detection light beam 4a in addition to the detection light beam 4b that is currently detected. Thereafter, the main CPU 11 returns to the step S22. When determining that the detection light beam 4b has not been detected, the main CPU 11 advances to a step S27 and performs control of displaying a notice on the image 4 to turn the light detection sensor 6 to the right (see FIG. 10). In other words, the main CPU 11 notifies the user to turn the light detection sensor 6 (light receiving portion 21) to the right in order for the light detection sensor 6 to detect the detection light beam 4b in addition to the detection light beam 4a that is currently detected. Thereafter, the main CPU 11 returns to the step S22.

When determining that neither the detection light beam 4a nor 4b has been detected at the step S24, the main CPU 11 performs control of displaying a notice on the image 4 to move the light detection sensor 6 away from the image 4 (see FIG. 11) at a step S28.

The remaining structure of the projector 200 according to the second embodiment is similar to that of the projector 100 according to the aforementioned first embodiment.

Also according to the second embodiment, as hereinabove described, the projection apparatus 1 projecting the image 4 and the light detection sensor 6 receiving the laser beam are separately provided, similarly to the aforementioned first embodiment, whereby the projector 200 can be downsized even when the user tries to enlarge the image 4 projected on the projection surface 3 in the projector 200 acquiring the position of the detection object 5 on the image 4.

According to the second embodiment, as hereinabove described, the main CPU 11 is configured to project the detection light beams 4a and 4b on the vicinities of two corners closer to the light detection sensor 6 of the four corners of the projected rectangular image 4 and acquire the light receiving range of the light receiving portion 21 with respect to the image 4 on the basis of the result of the detection light beams 4a and 4b received by the light receiving portion 21. Thus, when the light receiving range of the light receiving portion 21 widens in a sectorial shape, the light receiving portion 21 detects the detection light beams 4a and 4b in the vicinity of the two corners closer to the light detection sensor 6 of the four corners of the projected rectangular image 4, whereby the main CPU 11 can easily determine whether or not the image 4 is included in the light receiving range of the light receiving portion 21.

According to the second embodiment, as hereinabove described, the main CPU 11 is configured to perform control of notifying the user of the direction in which the light detection sensor 6 is moved or the position to which the light detection sensor 6 is moved on the basis of the result of the detection light beams 4a and 4b received by the light receiving portion 21. Thus, the position and orientation of the light detection sensor 6 can be easily corrected, and hence the user can reliably receive the laser beam reflected by the detection object 5.

The remaining effects of the second embodiment are similar to those of the aforementioned first embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the user's finger is employed as the detection object in each of the aforementioned first and second embodiments, the present invention is not restricted to this. According to the present invention, a touch pen, a pen, or the like may alternatively be employed as the detection object.

Figure 13:
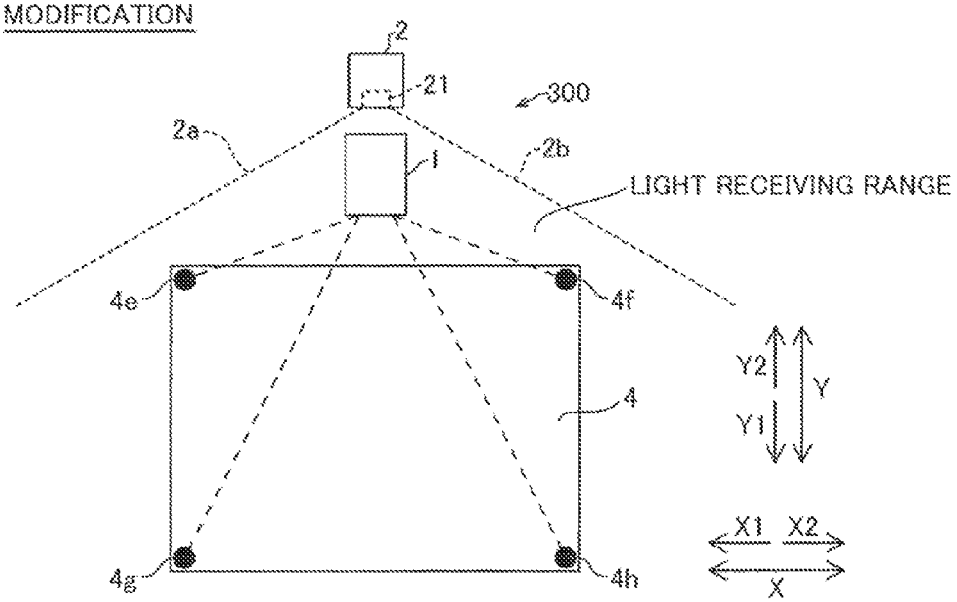
FIG. 13 is a diagram for illustrating detection light beams of a projector according to a modification of the first embodiment of the present invention.

While the detection light beams are projected on the outside of the vicinity of the outer periphery of the projected image in each of the aforementioned first and second embodiments, the present invention is not restricted to this. According to the present invention, detection light beams 4e, 4f, 4g, and 4h may alternatively be projected on the inside of the vicinity of the outer periphery of a projected image 4, as in a projector 300 according to a modification shown in FIG. 13. Alternatively, detection light beams may be projected on both the outside and the inside of the vicinity of the outer periphery of a projected image.

While the detection light beams are projected on the vicinities of the four corners of the projected rectangular image in the aforementioned first embodiment and the detection light beams are projected on the vicinities of the two corners closer to the light detection sensor of the four corners of the projected rectangular image in the aforementioned second embodiment, the present invention is not restricted to this. According to the present invention, it is simply required to project the detection light beams on the vicinities of at least the two corners closer to the light detection sensor of the four corners of the projected rectangular image. Three detection light beams or more than four detection light beams including the detection light beams in the vicinity of the two corners closer to the light detection sensor may alternatively be projected, for example.

While the detection light beams are projected by applying the red laser beam employed to project the image in each of the aforementioned first and second embodiments, the present invention is not restricted to this. According to the present invention, the detection light beams may alternatively be projected by a (invisible) dedicated laser beam for detection not contributing to image projection, such as an infrared laser beam. Alternatively, the detection light beams may be projected by applying the green or blue laser beam other than the red laser beam.

While the control portion (main CPU) is provided in the projection apparatus of the projector in each of the aforementioned first and second embodiments, the present invention is not restricted to this. According to the present invention, the control portion may alternatively be provided in the light detection sensor or in both the projection apparatus and the light detection sensor. Alternatively, the control portion may be provided in another apparatus other than the projection apparatus and the light detection sensor.

While the projection apparatus is arranged away from the light detection sensor in each of the aforementioned first and second embodiments, the present invention is not restricted to this. According to the present invention, the projection apparatus may alternatively be placed on the light detection sensor so far as the projection apparatus is provided separately from the light detection sensor.

While the user is notified by displaying the direction in which the light detection sensor is moved or the position to which the light detection sensor is moved on the image in each of the aforementioned first and second embodiments, the present invention is not restricted to this. According to the present invention, the user may alternatively be notified by displaying the direction in which the light detection sensor is moved or the position to which the light detection sensor is moved on another display portion or by sound.

While the projected image has a rectangular shape in each of the aforementioned first and second embodiments, the present invention is not restricted to this. According to the present invention, the projected image may alternatively have a shape other than the rectangular shape. The projected image may have a trapezoidal shape or the like, for example.

While the processing performed by the control portion (main CPU) according to the present invention is described, using the flowchart described in a flow-driven manner in which processing is performed in order along a processing flow for the convenience of illustration in each of the aforementioned first and second embodiments, the present invention is not restricted to this. According to the present invention, the processing performed by the control portion may alternatively be performed in an event-driven manner in which processing is performed on an event basis. In this case, the processing performed by the control portion may be performed in a complete event-driven manner or in a combination of an event-driven manner and a flow-driven manner.

What is claimed is:

1. A projector comprising:
   a projection portion including a laser beam generation portion outputting a laser beam and a scanning portion scanning the laser beam, projecting an image;
   a light detection sensor provided separately from the projection portion, including a light receiving portion receiving the laser beam reflected by a detection object; and
   a control portion acquiring a position of the detection object on the image on the basis of a detection result of the laser beam received by the light receiving portion.

2. The projector according to claim 1, wherein
   the control portion is configured to project a detection light beam on a vicinity of an outer periphery of the image that is projected and acquire a light receiving range of the light receiving portion with respect to the image on the basis of a result of the detection light beam received by the light receiving portion.

3. The projector according to claim 2, wherein
   the control portion is configured to project a plurality of detection light beams on vicinities of the outer periphery of the image that is projected and acquire the light receiving range of the light receiving portion with respect to the image on the basis of a result of the detection light beams received by the light receiving portion.

4. The projector according to claim 3, wherein
   the control portion is configured to determine that the light receiving range of the light receiving portion includes an entirety of the image when the light receiving portion receives all the plurality of detection light beams.

5. The projector according to claim 2, wherein
   the control portion is configured to project the detection light beam on an outside of the vicinity of the outer periphery of the image that is projected.

6. The projector according to claim 3, wherein
   the image that is projected has a rectangular shape, and
   the control portion is configured to project the detection light beams on vicinities of at least two corners closer to the light detection sensor of four corners of the image that is projected and has the rectangular shape and acquire the light receiving range of the light receiving portion with respect to the image on the basis of the result of the detection light beams received by the light receiving portion.

7. The projector according to claim 6, wherein
   the control portion is configured to project the detection light beams on vicinities of the four corners of the image that is projected and has the rectangular shape and acquire the light receiving range of the light receiving portion with respect to the image on the basis of the result of the detection light beams received by the light receiving portion.

8. The projector according to claim 2, wherein
   the light detection sensor further includes a drive portion changing a light receiving direction of the light receiving portion, and
   the control portion is configured to change the light receiving direction of the light receiving portion by the drive portion such that the light receiving range of the light receiving portion includes an entirety of the image on the basis of the result of the detection light beam received by the light receiving portion.

9. The projector according to claim 8, wherein
   the control portion is configured to rotate the light receiving portion from an orientation of receiving a first detection light beam to an orientation of receiving a second detection light beam by the drive portion and calculate a distance between the light detection sensor and the image employed to detect the first detection light beam and the second detection light beam on the basis of a driving amount of the drive portion rotating an orientation of the light receiving portion when the light receiving portion cannot detect at least one of a plurality of detection light beams.

10. The projector according to claim 9, wherein
    the control portion is configured to perform control of notifying a user of the distance between the light detection sensor and the image employed to detect the first detection light beam and the second detection light beam that is calculated.

11. The projector according to claim 2, wherein
    the control portion is configured to perform control of notifying a user of a direction in which the light detection sensor is moved or a position to which the light detection sensor is moved on the basis of the result of the detection light beam received by the light receiving portion.

12. The projector according to claim 1, wherein
    the control portion is provided in an apparatus provided with the projection portion.

13. The projector according to claim 12, wherein
    the light detection sensor further includes a communication portion configured to transmit a reception result of the detection light beam to the control portion provided in the apparatus provided with the projection portion.

14. The projector according to claim 2, wherein
    the laser beam generation portion has a red laser beam generation portion, a green laser beam generation portion, and a blue laser beam generation portion, and
    the control portion is configured to project the detection light beam by a red laser beam generated from the red laser beam generation portion configured to project the image.

15. The projector according to claim 2, wherein
    the control portion is configured to project the detection light beam by an infrared laser beam.

16. A projector system comprising:
    a projection apparatus including a laser beam generation portion outputting a laser beam and a scanning portion scanning the laser beam, projecting an image;
    a light detection apparatus provided separately from the projection apparatus, including a light receiving portion receiving the laser beam reflected by a detection object; and
    a control portion acquiring a position of the detection object on the image on the basis of a detection result of the laser beam received by the light receiving portion of the light detection apparatus.

17. The projector system according to claim 16, wherein
    the control portion is configured to project a detection light beam on a vicinity of an outer periphery of the image that is projected and acquire a light receiving range of the light receiving portion with respect to the image on the basis of a result of the detection light beam received by the light receiving portion.

18. The projector system according to claim 17, wherein the control portion is configured to project the detection light beam on an outside of the vicinity of the outer periphery of the image that is projected.

19. The projector system according to claim 17, wherein the image that is projected has a rectangular shape, and
the control portion is configured to project detection light beams on vicinities of at least two corners closer to the light detection apparatus of four corners of the image that is projected and has the rectangular shape and acquire the light receiving range of the light receiving portion with respect to the image on the basis of a result of the detection light beams received by the light receiving portion.

20. The projector system according to claim 19, wherein the control portion is configured to project the detection light beams on vicinities of the four corners of the image that is projected and has the rectangular shape and acquire the light receiving range of the light receiving portion with respect to the image on the basis of the result of the detection light beams received by the light receiving portion.

* * * * *